United States Patent [19]
Kuramoto et al.

[11] 3,757,660
[45] Sept. 11, 1973

[54] PHOTOGRAPHIC CAMERA CAPABLE OF MAKING MULTIPLE EXPOSURES

[75] Inventors: Yoshio Kuramoto, Toyonaki-shi; Toshio Kobori, Osaka-fu; Hiroshi Ueda, Nara-ken, all of Japan

[73] Assignee: Minolta Camera Kabushiki Kaisha, Osaka-fu, Japan

[22] Filed: Dec. 22, 1972

[21] Appl. No.: 317,819

[52] U.S. Cl. ............ 95/31 AC, 95/31 FL, 242/71.4
[51] Int. Cl.. G03b 17/42, G03b 19/04, G03b 15/00
[58] Field of Search ..................... 95/31 AC, 31 FL; 242/71.4, 71.5, 71.6

[56] References Cited
UNITED STATES PATENTS

| | | | |
|---|---|---|---|
| 3,621,770 | 11/1971 | Tsuruoka | 95/31 AC X |
| 3,650,191 | 3/1972 | Nomura et al. | 95/31 R |
| 3,687,039 | 8/1972 | Furuta | 95/31 AC |

*Primary Examiner*—Robert P. Greiner
*Attorney*—Watson, Cole, Grindle & Watson

[57] ABSTRACT

A photographic camera capable of making multiple exposures on a single film frame, the camera being of the type in which the advance of a single frame of film and the cocking of the shutter are effected by a single winding operation. The camera is provided with a first gear member rotatable for transmitting the rotary movement of the winding operation to a cocking member of the shutter, a second gear member rotatable for transmitting the rotary movement of the winding operation to a film winding spool through a friction clutch means, a third gear member rotatable for transmitting the rotary movement of the winding operation to a film transporting sprocket by way of a clutch means, a push button member actuatable for disconnecting the clutch means, and a blocking member for maintaining the clutch means in the disconnected condition and blocking the rotation of the film winding spool in the forward film winding direction against the action of the friction clutch means. The camera may be placed in a condition ready for double exposures simply by pressing the push button member, and after completion of the shutter cocking, the film winding spool is automatically relieved from the blocking action of the blocking member and the clutch is connected for associating the shutter cocking mechanism again with the film winding mechanism.

8 Claims, 17 Drawing Figures

Patented Sept. 11, 1973

3,757,660

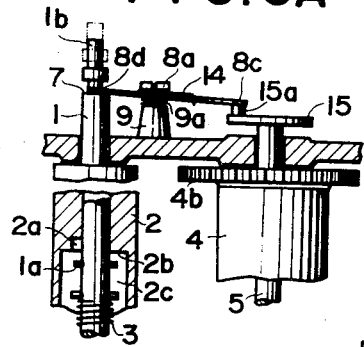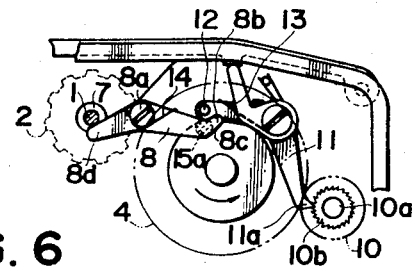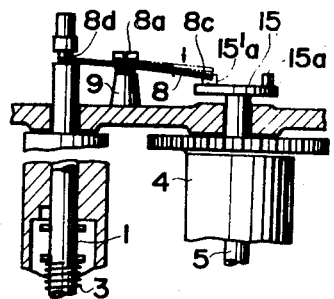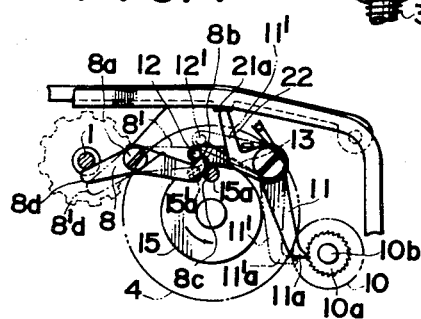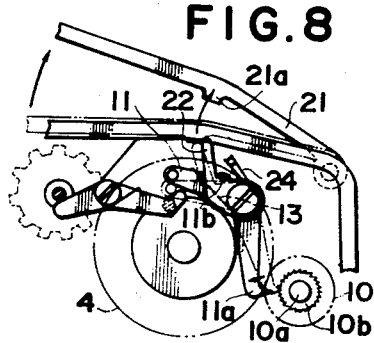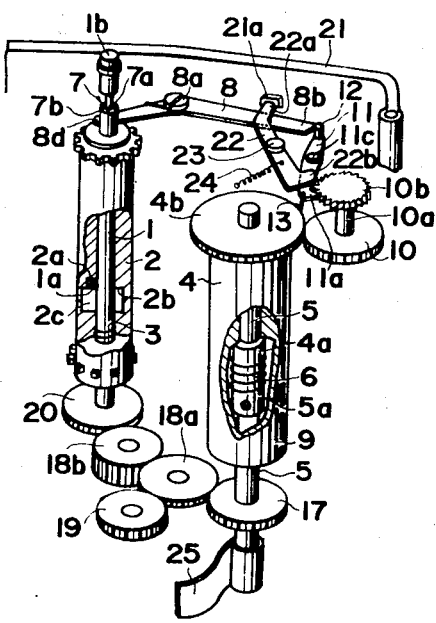

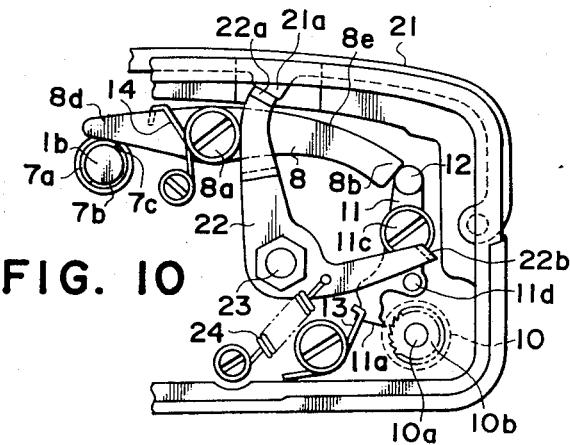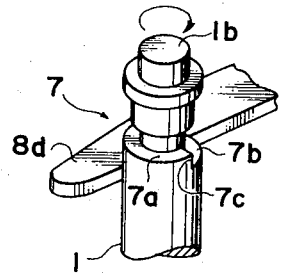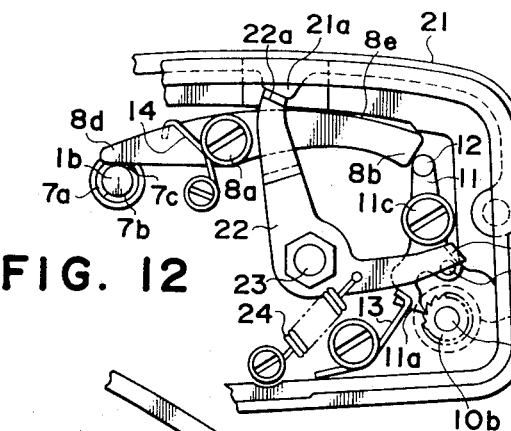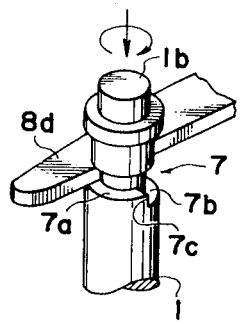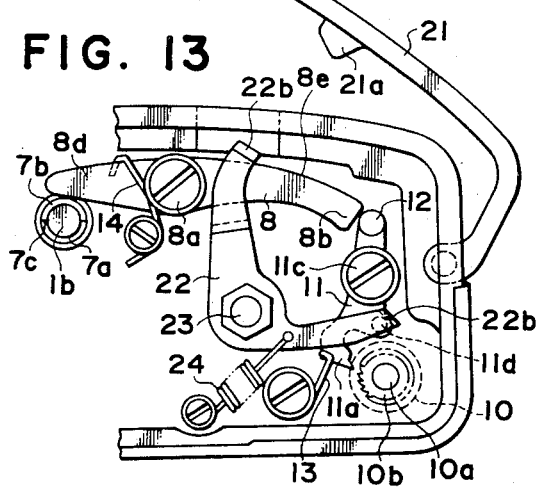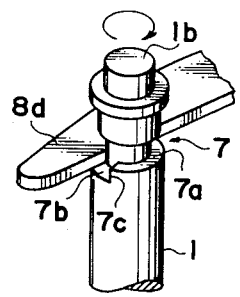

3,757,660

PHOTOGRAPHIC CAMERA CAPABLE OF MAKING MULTIPLE EXPOSURES

BACKGROUND OF THE INVENTION

FIELD OF THE INVENTION

This invention relates to a photographic camera capable of making multiple exposures on one frame of a film and more particularly, to a photographic camera of the type where the frame-by-frame feeding of the film is effected in association with the cocking of the shutter, the camera being capable of temporary disconnection of the film winding mechanism from the shutter cocking mechanism for allowing multiple exposures on the same frame, and automatically returning these two mechanisms to the normal associated condition after completion of the shutter cocking preparatory to a multi-exposure operation.

The conventional photographic cameras of the type where the shutter cocking is effected in association with the film winding operation are advantageous in preventing feeding of unexposed film to the winding spool, and also preventing double exposures on one frame of the film. However, with photographic cameras of this type, it is difficult to make double exposures purposely, to give a special photographic effect to a particular frame of the film.

In this connection, U.S. Pat. No. 3,650,191 discloses a photographic camera construction wherein there is provided a clutch which is operated by a push button for disconnecting a film winding operation from the shutter cocking operation. However, this type of clutch is defective in that it requires the push button to remain pressed until the shutter cocking for the double exposure has been completed, and in that the clutch cannot be disconnected by one touch of the push button in order to place the camera in a condition ready for making the second exposure. The prior art clutch mechanism has the further defect that it involves complicated operation and that if the push button is released during the cocking operation of the shutter, prior to the double exposure, the film is partially advanced and the exposure is effected on two different frames of the film.

In an attempt to eliminate the aforementioned defects, the present invention contemplates effecting the disconnection of the clutch between the film winding mechanism and the shutter cocking mechanism by a one touch operation of the push button, in such a manner that the disconnection is continued until the shutter cocking for the double exposure has been completed while maintaining the film stationary, and upon completion of the shutter cocking operation the clutch is automatically connected again for returning the film winding mechanism and the shutter cocking mechanism to the initial associated state. Triple or more exposures can be made on one frame by repeating the above mentioned operation.

OBJECTS OF THE INVENTION:

The primary object of the present invention is to provide a photographic camera capable of making multiple exposures and having a film winding mechanism connected with a shutter cocking mechanism by way of a clutch means, wherein the clutch is held in a disconnected condition and, at the same time, the film is held stationary by one touch operation of a manipulating member for allowing the shutter cocking without a simultaneous winding operation.

Another object of the present invention is to provide a photographic camera capable of making multiple exposures on a single frame and having a film winding mechanism connected with a shutter cocking mechanism by way of a clutch means, wherein the clutch is disconnected by a one touch operation of an operating member and held in the disconnected position by means of a blocking member while holding the film winding spool stationary, and upon completion of the shutter cocking operation the clutch is relieved from the blocking action of the blocking member.

Still another object of the present invention is to provide a photographic camera capable of making multiple exposures on a single frame, wherein there is provided a blocking member which is adapted to maintain a clutch in a disconnected state while blocking rotation of a film winding spool, the clutch being relieved from the action of the blocking member by rotation of the film winding spool through an angle corresponding to completion of shutter cocking by the winding operation.

A further object of the present invention is to provide a photographic camera capable of making multiple exposures in a single frame, wherein the clutch is maintained in a disconnected condition and the film winding spool is blocked against rotation by the action of a blocking member, the blocking action of the blocking member being removed by rotation of a sprocket shaft through an angle corresponding to completion of the shutter cocking by the winding operation.

A still further object of the present invention is to provide a photographic camera capable of making such multiple exposures, wherein the film may be rewound by manipulating the operating member which is provided for disconnecting the clutch between the film winding mechanism and the shutter cocking mechanism for multiple exposure purposes, while rotating a film rewinding shaft.

A still further object of the present invention is to provide a photographic camera capable of making multiple exposures, wherein the blocking action of the operating member on the film winding spool is removed by opening of the rear lid of the camera.

SUMMARY OF THE INVENTION

According to the present invention, there is provided a photographic camera capable of making the aforesaid multiple exposures, characterized in that said camera comprises, for attaining the above noted objects, a first gear means rotatable in relation to a winding operation for transmitting rotational movement for cocking the shutter, a second gear means for transmitting the rotational movement of the winding operation to a film winding spool by way of a friction clutch, a third gear means for transmitting the rotational movement of the winding operation to a film feeding sprocket by way of a clutch, an operating member for disconnecting the last mentioned clutch, a stop member for stopping rotational movement, in the forward film winding direction, of the film winding spool against action of the friction clutch, and a blocking member engageable with the operating member and the stop member, wherein the clutch is disconnected by a one touch operation of the operating member, the blocking member maintaining the operating member in the actuated condition and stopping rotation of the spool in the film advancing direction for blocking the feeding of the film while effecting the shutter cocking only and, upon completion of the shutter cocking, a relieving member automatically removing the blocking action by the blocking member on the operating member, for connecting the clutch again and relieving the winding spool from the blocking action by the stop member.

A feature according to the present invention resides in that the clutch which transmits the rotational movement of the third gear member to the film feeding sprocket is disconnected by one touch operation of the operating member and the operating member is held in the clutch disconnecting position by the blocking member, while the film advance by the winding operation is inhibited by the blocking member which blocks the rotation in the forward direction of the film winding spool, notwithstanding the rotation of the friction clutch.

Another feature of the present invention resides in that upon completion of the shutter cocking for the double exposure the relieving member automatically relieves the operating member from the action of the blocking member, for re-engaging the clutch between the third gear means and the film feeding sprocket, and relieving the film winding spool from the blocked position to again associate the shutter cocking with the film advance winding operation.

The above mentioned relieving member is mounted on a spool shaft which is rotatable with the second gear means, arrangement being made in such a manner that the operating member is relieved from the blocking action of the blocking member by one revolution of the spool shaft, or of the sprocket shaft which is rotatable together with the third gear means.

Still another feature of the present invention resides in that it is made possible to rewind the film by operating the usual film rewinding shaft while continuously actuating the operating member to prevent the relieving action imposed by the relieving member on the blocking member.

A fourth feature of the present invention resides in that there is provided a relieving member which automatically frees the film spool when the lid of the camera is opened to load a new roll of film, after rewinding of the exposed film, even if the clutch is connected and the operating member is blocked by the blocking member.

BRIEF DESCRIPTION OF THE DRAWINGS

FIG. 5A and FIG. 5B show the clutch means disconnected by manipulation of the operating member, 5A being a vertical cross-section and 5B being a top plan view;

FIG. 6 is a partially sectioned fragmental side view showing the clutch means held in the disconnected state by a blocking member, the broken line showing the same in a state immediately before being released by the relieving member;

FIG. 7 is a top plan view of the mechanism of FIG. 6;

FIG. 8 is a top plan view showing a relieving member actuated by opening of the rear lid of the camera;

FIG. 9 through 13 show another embodiment according to the present invention, of which:

FIG. 9 is a partially sectioned fragmentary perspective view showing essential parts of the second embodiment;

FIG. 10 is a top plan view of the same;

FIGS. 11A, 11B and 11C are perspective views showing the manner in which the operating member, blocking member and the relieving member are associated with each other, showing at 11A the clutch means in a connected state, at 11B the clutch means in a disconnected state, and 11C the clutch means immediately before being relieved from the disconnected state;

FIG. 12 is a top plan view showing the clutch means maintained in a disconnected state; and FIG. 13 is a top plan view showing the clutch means relieved from the disconnected state by opening of the rear lid of the camera.

Figure 1:
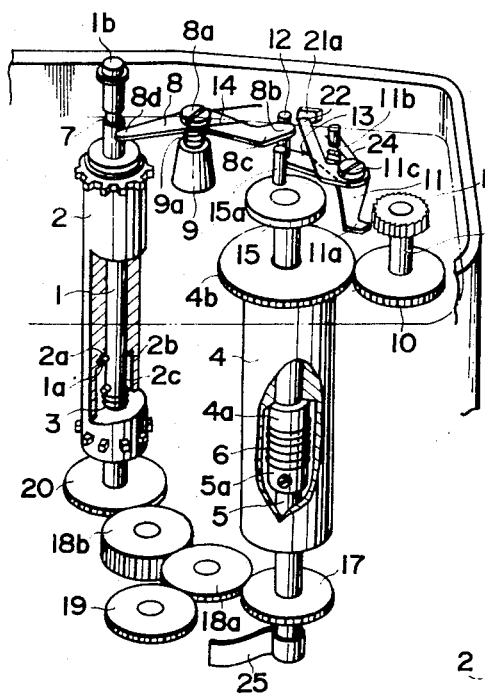
FIG. 1 is a perspective view showing essential parts of an embodiment according to the present invention.
Figure 2:
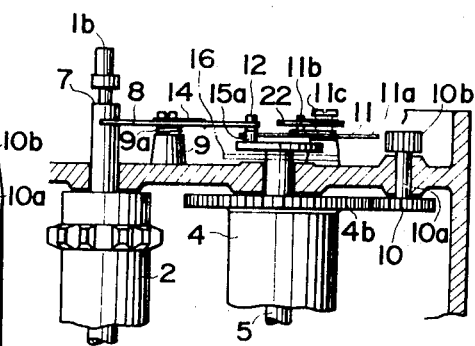
FIG. 2 is a partially sectioned side view of the same embodiment.
Figure 3:
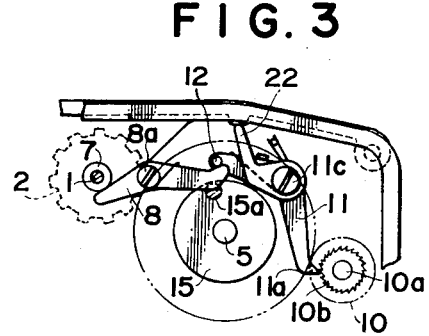
FIG. 3 is a plan view of the same embodiment.

DESCRIPTION OF PREFERRED EMBODIMENTS:

Referring to FIGS 1 through 8 showing a first embodiment of the present invention, a sprocket shaft 1 is loosely fitted into an axial bore of a sprocket 2. The sprocket 2 is interiorly provided with a notched portion 2a at a shoulder portion 2b which is contiguous to a larger diameter portion 2c of the axial bore, for receiving and engaging with a projection 1a which is radially projected from the sprocket shaft 1, the notched portion 2a and the projection 1a forming a clutch means. The accompanying drawings show the various parts in the positions which they occupy when the camera is upside down. The directional terms such as "upper," "lower," "clockwise" and "counterclockwise" together with other similar terms used herein are intended to indicate directions as seen in the accompanying drawings, only for the convenience of explanation.

The respective ends of the above-mentioned sprocket shaft 1 extend from the sprocket 2. The lower end of the sprocket 1 has mounted securely thereon a third gear member 20. In the upper protruding portion of the sprocket shaft 1, there is formed an annular groove 7. The upper end of the sprocket shaft is projected upwardly out of the camera casing to form an operating button 1b. In the larger dimeter portion 2c between the sprocket 2 and the sprocket shaft 1, there is accommodated a spring member 3 to bias the operating button 1b to project upwardly and to urge the projection 1a to slidably contact the shoulder portion 2b, so that, when the projection 1a comes to a position corresponding to the notched portion 2a, the projection 1a is brought into engagement with the notched portion 2a to connect the clutch.

Loosely fitted into an axial bore of a film winding spool 4 is a spool shaft 5 the upper and lower ends of which project outwardly from the spool body. A second gear member 17 is securely mounted on the downward projection of the spool shaft 5 the lowermost end of which is securely connected to a winding lever 25. The upper end of the spool shaft 5 bears a flange 15 which has a relieving pin member 15a projected upwardly therefrom. There is provided interiorly of the spool cylinder 4 a collar member 4a which is loosely fitted over the spool shaft 5. One end of the collar member 4a is disposed in face-to-face relationship with one end of another collar member 5a which is fixedly secured on the spool shaft 5. A coil spring 6 is fitted over the facing ends of the collar members 4a and 5a to form a friction clutch.

The above mentioned spool cylinder 4 has securely mounted on the upper end thereof a gear member 4b which is meshed with a gear member 10 which is mounted on a shaft 10a. A ratchet gear 10b is mounted on this shaft 10a in coaxial relationship with the gear member 10.

The second gear member 17 to which the winding lever 25 is fixed through the shaft 5 is in meshing engagement with an intermediate gear member 18a which is meshed with a first gear member 19, a gear for effecting shutter cocking. The intermediate gear member 18a is also meshed, through the thicker intervening gear 18b, with the above mentioned third gear member 20 at the lower end of the sprocket shaft 1. The meshing engagement between the intermediate gear member 18a and the third gear member 20 is thus always maintained irrespective of the positional change of the sprocket shaft 1 with respect to the sprocket 2.

A counterclockwise rotation of the winding lever 25, as seen in FIG. 1, imparts rotational movement in the same direction to the second gear member 17 and the spool shaft 5, rotating the first gear member 19 in the counterclockwise direction, and then the third gear member 20 and the sprocket shaft 1 in the clockwise direction, respectively.

A blocking lever member 8 is rotatably supported on a shaft 8a on a base block member 9, the blocking lever member 8 constantly receiving a thrusting force from a spring member 9a. The blocking lever 8 is biased to rotate in the clockwise direction by the action of a spring member 14 and has an arm 8d which is abutted against the outer periphery of the sprocket shaft 1 at a position below the annular groove 7 thereof when the clutch elements 1a and 2a are connected, while the side edge portion 8c of the other arm is normally disposed out of the path of the rotational movement of the relieving pin member 15a mentioned hereinbefore and is brought into the path of the relieving pin member 15a for engagement therewith when the blocking member is tilted. Th arm end portion 8b is constantly held in abutting engagement with a pin member 12 which is planted in a stopping lever member which will be described hereinafter.

The stopping lever 11 is rotatably supported on the camera body by way of a shaft 11c and is weakly biased to rotate in the counterclockwise direction by the action of a spring member 13. The stopping lever 11 carries on one arm thereof the pin member 12 which is held in abutting engagement with the arm 8b of the blocking lever 8 in the manner mentioned hereinbefore, and has on the other arm a claw 11a which is positioned adjacent the ratchet gear 10b and engaged therewith or disengaged therefrom in accordance with the rotational movement of the lever.

The shaft 11c also supports rotatably thereon a relieving lever 22 which is urged to rotate in the clockwise direction by means of a spring member 24. The distal end of the relieving lever 22 is engageable with a projection 21a formed on the rear lid 21 of the camera when the lid is in closed position, rotating slightly in the counterclockwise direction against the action of the spring 24. When the lid is opened, the relieving lever 22 is rotated in the clockwise direction, with the side edge thereof being brought into engagement with a curved strip member 11b of the stopping lever 11, thereby rotating the same in the clockwise direction against the action of the spring member 13 to bring the claw 11a into a position retracted from the ratchet gear 11b.

Figure 4A:
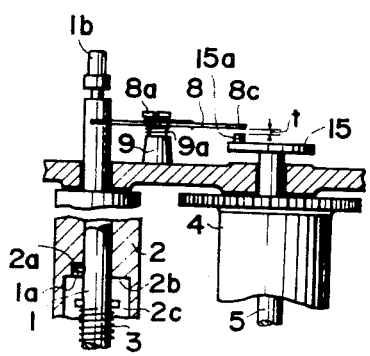
FIG. 4A and 4B show the clutch means in a connected state, 4A being a partially sectioned side view and 4B being a top plan view.
Figure 4B:
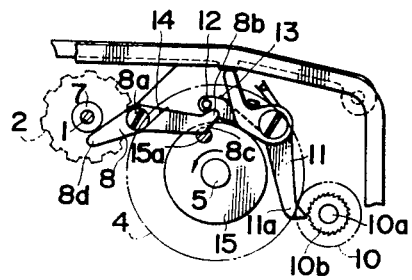

In the present embodiment, the clutch elements 1a and 2a are engaged in the positions shown in FIGS. 1 and 4A, and the claw 11a of the stopping lever member 11 is held in a position retracted from the ratchet gear 10b, so that, by rotating the winding lever 25 in the counterclockwise direction, the first gear member 19 is rotated to commence the shutter cocking. At the same time, the rotational movement of the second gear member is transmitted through the spool shaft 5 and collar members 5a and 4a frictionally to rotate the spool cylinder 4, while the rotational movement of the third gear member 20 is transmitted through the sprocket shaft 1 and clutch elements 1a and 2a to the sprocket 2 for effecting the transportation and winding up of the film by a length corresponding to one frame in association with the shutter cocking as in the existing cameras. When the film has been wound up by one frame, the winding is stopped and the winding lever 25 is rendered rotatable again only after the shutter has been released. The same procedure is repeated for taking another shot.

Now, when it is desired to make a double exposure on a particular frame which has once been subjected to an exposure, the operating button 1b is pressed down against the action of the spring member 3. Thereupon, the sprocket shaft 1 is moved downwardly with respect to the sprocket 2, disengaging the projection 1a from the notched portion 2a to disconnect the clutch. When the annular groove 7 is lowered to the level of the arm end 8a of the blocking lever 8, the arm end 8a of the blocking lever 8 which is biased to rotate in the clockwise direction is brought into engagement with the annular groove 7 and rotated in the clockwise direction. The other arm end 8b is rotated accordingly, and the rotational movement of the arm end 8b of the blocking lever 8 is followed by the pin member 12 to bring the claw 11a of the stopping lever 11 into engagement with the ratchet gear 10b for stopping the rotation thereof. If the pressing force on the operating button 1b is removed at this time, the sprocket shaft 1 is moved slightly upwardly by the action of the spring 3 and the blocking lever 8 is tilted in the manner as shown in FIG. 5 against the action of the thrust spring 9a, while maintaining the arm end 8d in engagement with the annular groove 7 and blocking the returning movement of the sprocket shaft 1, thus maintaining the clutch elements 1a and 2a in a disengaged condition.

On the other hand, as shown particularly in FIG. 5A, the side edge portion 8c of the other arm of the blocking lever 8 which is normally positioned over and disengaged from the relieving pin member 15a is brought into a position within the path of the rotational movement of the relieving pin member 15a when the blocking lever member is tilted.

Accordingly, by the winding operation of the winding lever 25, the first gear member 19 is rotated to carry out shutter cocking. However, since the rotation of the gear 10 is blocked in the clockwise direction, the friction clutch elements 4a and 5a slide over each other, so that only the spool shaft 5 is rotated and the rotation of the spool cylinder 4 is blocked. At the same time, the sprocket shaft 1 is rotated by the third gear member 20; however, no film is advanced since the clutch elements 1a and 2a are held in disengagement. The film is stopped in the same position as in the previous exposure and only the shutter cocking for the double exposure is effected. While the shutter is being cocked, the relieving pin member 15a completes one revolution. Upon completion of the shutter cocking, the relieving pin member 15a is brought into engagement with the arm 8c of the blocking lever 8, which is positioned within the path thereof, for rotating the same in the counterclockwise direction against the action of the spring 14, the arm end 8b pushing the pin member 12 to rotate the stopping lever 11 in the clockwise direction for disengaging the claw 11a from the ratchet gear 10b. By the counterclockwise rotation of the blocking lever 8, the arm end 8d is also rotated out of the annular groove 7, allowing the sprocket shaft 1 to return to the position of FIGS. 1, 2, 3 and 4A under the influence of the action of the spring member 3 for connecting the clutch elements 1a and 2a. When the sprocket shaft 1 is returned to the initial position, the blocking lever 8 is stopped in a position rotated in the counterclockwise direction by the circumferential surface of the sprocket shaft 1, and the claw 11a of the stopping lever 11 is held in a position retracted from the ratchet gear 10b. Therefore, if the cocked shutter is released for making a second exposure on a film frame which has previously been subjected to a first exposure and thereafter the winding lever is rotated, the film advance is carried out in association with the shutter cocking.

When it is desired to make more than two exposures on one end and same frame of the film, the operating button 1b is pressed again, followed by a winding operation.

In order to rewind the film, the operating button 1b is pressed down for disconnecting the clutch elements 1a and 2a and then a film rewinding shaft, which is not shown, is rotated manually or by other suitable means. The film may be rewound without hindrance since the sprocket 2 is freely rotatable and the ratchet gear 10b may be rotated in the reverse direction even though it is engaged with the claw 11a. During the rewinding operation, the blocking lever 8 is reset at every revolution of the relieving pin member 15a so that it is necessary to continue to press the operating button 1b. If the blocking lever 8 were not in the reset condition, engaging with the relieving pin member 15a, when the film rewinding ended the blocking lever would be in engagement with the annular groove 7 and the clutch elements 1a and 2a would be disconnected, the claw 11a blocking the rotation of the spool cylinder 4 in the film winding direction. This would prevent loading a new roll of film in the camera. This problem is solved by the provision of the relieving lever 22. When the rear lid 21 of the camera is opened for replacement of the film, the relieving lever 22 is freed from the pressing action of the projection 21a and allowed to rotate in the clockwise direction under the influence of the spring member 24, the side edge portion of the relieving lever 22 urging the stopping lever 11 to rotate in the clockwise direction for disconnecting the claw 11a of the stopping lever 11 from the ratchet gear 10b.

Referring to FIGS. 9 to 13 in a second embodiment of the present invention, the annular groove is formed in a particular shape such that the blocking lever is reset automatically by one complete revolution of the sprocket shaft, in contrast to the arrangement of the first embodiment where the blocking lever is reset by a relieving pin member on a flange which is securely mounted on the spool shaft. Similar parts are designated by similar reference numerals throughout the first and second embodiments.

The clutch elements 1a and 2a provided, respectively, on the sprocket shaft 1, on which the third gear 20 is securely mounted, and on the sprocket 2 have the same construction as in the first embodiment, the sprocket shaft 1 being biased to assume its uppermost position by means of the spring member 3 in the same manner. The sprocket shaft 1 is formed with an annular groove 7 on the circumference of the upper end portion which extends upwardly from the sprocket 2 to form an operating button 1b. The bottom surface of the annular groove is centrally divided into two staggered surfaces of semicircular shape 7a and 7b forming a stepped portion 7c therebetween (FIGS. 11A, 11B, 11C). On the other hand, the blocking lever 8 is rotatably supported on the camera body by means of a shaft 8a without using a thrust spring 9a as in the first embodiment, and is biased to rotate in the counterclockwise direction by a spring member 14. The blocking lever 8 has one arm 8d thereof in abutting relationship with the outer periphery of the sprocket shaft 1 at a position below the annular groove 7. The other arm 8b of the blocking lever is abutted against the pin member 12 of the stopping lever 11.

When the operating button 1b is in the upward position with the clutch elements 1a and 2a connected to each other, the blocking lever 8 is in a position rotated in the clockwise direction, against the action of the spring 13 which is biasing the stopping lever 11, thus holding the claw 11a disengaged from the ratchet gear 10b, allowing the winding spool cylinder 4 to be rotated in the counterclockwise direction. Thus, when the winding lever 25 is rotated in the counterclockwise direction, the second gear member 17 rotates the spool shaft 5 for imparting counterclockwise rotational movement to the spool cylinder 4 by way of the frictional clutch elements 5a and 4a, while the first gear member 19 carries out the shutter cocking. The third gear member 20 imparts clockwise rotational movement to the sprocket 2 by way of the clutch elements 1a and 2a for transporting the film at the same time with the shutter cocking by one winding operation.

In order to give a double exposure, the operating button is pressed down after the first ordinary exposure. This causes the clutch elements 1a and 2a to be disconnected from each other and lowers the annular groove 7 from the position of FIG. 10 to the position of FIG. 12, allowing the arm end 8d of the blocking lever 8 to engage with the groove 7, so that the returning movement of the sprocket shaft 1 urged by the spring 3 is blocked even if the pressure on the operating button 1b is removed. The arm end 8d of the blocking lever 8 is held in engagement with the surface 7a of the annular groove 7.

By the counterclockwise rotation of the blocking lever 8, the arm end 8d is disengaged from the pin member 12 of the stopping lever. The pin member 12 follows the movement of the blocking lever 8 and the stopping lever 11 is rotated in the counterclockwise direction by the action of the spring member 13 to bring the claw 11a into engagement with the ratchet gear 10b (FIG. 12).

Therefore, although the winding lever 25 is operated to rotate the second gear member 17 and the spool shaft 5, the frictional clutch elements 5a and 4a slide over each other and no rotational movement is transmitted therebetween, since the spool cylinder 4 is held in the blocked position. Further, although the third gear 20 and the sprocket shaft 1 are rotated, no rotational movement is transmitted to the sprocket 2 since the clutch elements 1a and 2a are disengaged, thus enabling shutter cocking by the first gear member 19 without advance of the film.

When the sprocket shaft 1 completes half a revolution, the arm end 8d of the blocking lever 8 is shifted from the surface 7a to the lower surface 7b of the annular groove 7 as shown in FIG. 11C. This allows the sprocket shaft 1 to rise by a distance corresponding to the height of the stepped portion 7c; however, the clutch elements 1a and 2a are still maintained disengaged. When the sprocket shaft 1 completes the second half revolution, the stepped portion 7c is brought into abutting engagement with the side edge of the arm end 8d. The arm end 8d of the blocking lever 8 is pushed outwardly by the rotating stepped portion 7c and is thus disengaged from the annular groove 7, allowing the sprocket shaft 1 to return to the uppermost position under the influence of the spring member 3. Thus the blocking lever 8 is rotated in the clockwise direction against the action of the spring member 14 to assume the position shown in FIG. 11A, the arm end 8b pushing the pin member 12 to rotate the stopping lever 11 in the clockwise direction against the action of the spring member 13 for bringing the claw 11a into a position retracted from the ratchet gear 10b and relieving the stopping action on the spool cylinder 4. At this time, the shutter cocking is completed and the camera resumes the condition of FIG. 10 where the shutter cocking is associated with the film winding operation. Thereafter, the thus cocked shutter is released to make a double exposure. The same operation is repeated in order to make more than two exposures on the same frame of the film.

The film may be rewound in the same manner as in the first embodiment while pressing down the operating button.

Further, if the rear lid 21 of the camera is opened for film replacement, the relieving lever 22 is rotated in the counterclockwise direction by means of the spring member 24 and the bent strip 22a on one arm thereof is brought into engagement with the side edge 8e of the blocking lever 8, urging the same to rotate in the clockwise direction for disengaging the arm end 8d from the annular groove 7. Also, the bent strip 22b on the other arm of the relieving lever 22 is brought into engagement with the pin member 11d of the stopping lever 11 for retracting the claw 11a from the ratchet gear 10b, thus resetting the camera for associating the film rewinding with the shutter cocking, and allowing easy mounting of a new roll of film on the spool cylinder.

The foregoing is considered as illustrative only of the principles of the present invention. Further, since numerous modifications and changes will readily occur to those skilled in the art, it is not desired to limit the invention to the exact construction and operation shown and described, and accordingly all suitable modifications and equivalents may be resorted to, falling with the scope of the invention as claimed in the appended claims.

We claim:

1. A photographic camera for making multiple exposures on a single film frame comprising:
    a first member movable in association with a winding operation for cocking a shutter means;
    a second member movable in association with said first member for transmitting rotation to a film winding spool cylinder by way of a friction clutch;
    a third member movable in association with said first member for transmitting rotation to a film advancing sprocket by way of a clutch means which is biased to normally assume an engaged position;
    an operating member for manually disconnecting said last mentioned clutch means against said biasing force;
    a blocking member adapted to maintain said clutch means in a disengaged position against said biasing force;
    a stop member associated with said blocking member for blocking rotation of said spool cylinder in the film advancing direction; and
    a relieving member for relieving the clutch means from the disengaging action of said blocking member upon completion of the shutter cocking operation.

2. A photographic camera as set forth in claim 1, wherein said relieving member is rotatable with said second member for relieving the clutch means from the disengaging action of said blocking member upon completion of the shutter cocking operation by said first member.

3. A photographic camera as set forth in claim 1, wherein said relieving member is rotatable with said third member for relieving the clutch means from the disengaging action of said blocking member upon completion of the shutter cocking operation by said first member.

4. A photographic camera as set forth in claim 1, further comprising;
    a second relieving member for relieving the film winding spool from said blocking action of said stop member.

5. A photographic camera as set forth in claim 1, further comprising;
    a sprocket shaft securely supporting at one end thereof said third member and loosely fitted into a sprocket for movement between a first position and a second position, the sprocket shaft being biased to assume the first position by means of a spring;
    an annular groove formed on said sprocket shaft;
    clutch means provided between said sprocket shaft and said sprocket and adapted to be engaged when said sprocket shaft is in the first position and disengaged when said sprocket shaft is in the second position;
    a blocking member adapted to be engaged with said annular groove when said sprocket shaft is in the second position for blocking said sprocket shaft from returning to the first position under th influence of the spring;
    a spool shaft securely supporting said second member and loosely fitted in a spool cylinder for rotational movement therein;
    frictional clutch means provided between said spool shaft and cylinder for transmitting rotational movement of said spool shaft to said spool cylinder;
    a ratchet gear movable in assocation with said spool cylinder; and a stop member biased to engage with said blocking member and adapted to be engaged with said ratchet gear for preventing the rotational movement thereof when said blocking member is in engagement with said annular groove.

6. A photographic camera as set forth in claim 5, wherein said stop member prevents rotation of said ratchet gear in the film advancing direction without blocking rotation in the reverse direction, when in engagement with said ratchet gear.

7. A photographic camera as set forth in claim 5, further comprising a means including an eccentric pin member provided on a flange which is integrally rotatable with said spool shaft for disengaging said blocking member from said annular groove when said blocking member is disposed within the path of rotational movement of said eccentric pin member.

8. A photographic camera as set forth in claim 5, wherein said annular groove is formed with two semicircular lower surfaces at staggered levels and with a stepped surface connecting said two semicircular surfaces, said blocking member being engaged with the higher semicircular surface of said annular groove when said operating member is pressed into the second position after completion of exposure and being engaged with the lower semicircular surface when said sprocket shaft completes half a revolution in association with the winding operation, said stepped surface pushing said blocking lever out of said annular groove when said sprocket shaft finishes a revolution and said first member completes shutter cocking, allowing the sprocket shaft to return to the first position thereof.

* * * * *